(12) United States Patent
Nam et al.

(10) Patent No.: US 10,608,799 B2
(45) Date of Patent: Mar. 31, 2020

(54) APPARATUS AND METHOD FOR EFFECTIVE PTRS OPERATION AND INDICATION IN WIRELESS COMMUNICATION SYSTEM

(71) Applicant: Samsung Electronics Co., Ltd., Suwon-si, Gyeonggi-do (KR)

(72) Inventors: Hyungju Nam, Gwangmyeong-si (KR); Hyunil Yoo, Suwon-si (KR); Yongok Kim, Seoul (KR); Taeyoung Kim, Seoul (KR); Jeehwan Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/971,763

(22) Filed: May 4, 2018

(65) Prior Publication Data

US 2018/0323933 A1 Nov. 8, 2018

(30) Foreign Application Priority Data

May 4, 2017 (KR) .......................... 10-2017-0056941

(51) Int. Cl.
*H04L 5/00* (2006.01)
*H04W 72/12* (2009.01)
*H04W 72/04* (2009.01)

(52) U.S. Cl.
CPC ........... *H04L 5/0051* (2013.01); *H04W 72/12* (2013.01); *H04L 5/0053* (2013.01); *H04W 72/042* (2013.01)

(58) Field of Classification Search
CPC ...................................................... H04L 5/001
See application file for complete search history.

(56) References Cited

U.S. PATENT DOCUMENTS

| 2013/0114535 | A1 | 5/2013 | Ng et al. |
| 2018/0287759 | A1* | 10/2018 | Kundargi ............. H04L 5/0051 |
| 2018/0351719 | A1* | 12/2018 | Lee ....................... H04L 5/0048 |

(Continued)

OTHER PUBLICATIONS

National Instruments, "Discussion on Signaling for PT-RS", 3GPP TSG RAN WG1 Meeting #88bis, Apr. 3-7, 2017, 10 pages, R1-1705253.

(Continued)

*Primary Examiner* — Kevin M Cunningham

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure proposes a PTRS operation and indication method for phase noise compensation in a wireless communication system. Specifically, disclosed is a method for configuring and indicating a suitable PTRS for a signal transmission environment through information exchange between a base station and a terminal having different oscillator characteristics.

10 Claims, 13 Drawing Sheets

(56) References Cited

U.S. PATENT DOCUMENTS

2018/0359071 A1* 12/2018 Lee .................. H04L 7/0054

OTHER PUBLICATIONS

NTT DOCOMO, Inc., "Discussion on PT-RS", 3GPP TSG RAN WG1 Meeting #88bis, Apr. 3-7, 2017, 3 pages, R1-1705726.
Samsung, "DL PT-RS design", 3GPP TSG RAN WG1 #88bis, Apr. 3-7, 2017, 7 pages, R1-1705355.
Panasonic, "PT-RS port association and indication", 3GPP TSG RAN WG1 Meeting #88bis, Apr. 3-7, 2017, 5 pages, R1-1705160.
International Search Report dated Aug. 17, 2018 in connection with International Patent Application No. PCT/KR2018/005146, 3 pages.

* cited by examiner

FIG. 3
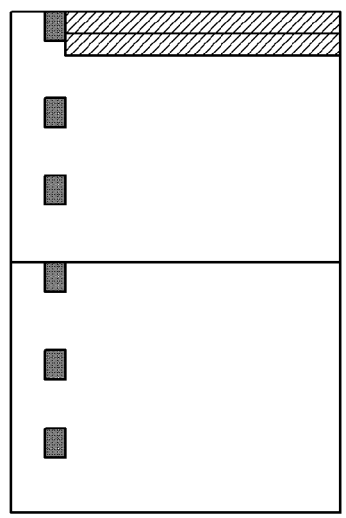
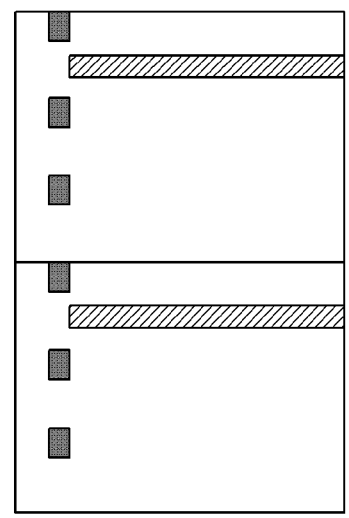
(a) Localized mapping  (b) Distributed mapping
 DMRS (310)
 PTRS (320)

FIG. 7

| 60kHz | | | | |
|---|---|---|---|---|
| | MCS8 | ... | MCS18 | MCS25 |
| 4RB | Configuration X | ... | Configuration C | Configuration F |
| | ⋮ | ... | | |
| 32RB | Configuration A | ... | Configuration D | Configuration G |
| 100RB | Configuration B | ... | Configuration E | Configuration H |

APPARATUS AND METHOD FOR EFFECTIVE PTRS OPERATION AND INDICATION IN WIRELESS COMMUNICATION SYSTEM

CROSS-REFERENCE TO RELATED APPLICATION AND CLAIM OF PRIORITY

This application is based on and claims priority under 35 U.S.C. § 119 to Korean Patent Application No. 10-2017-0056941 filed on May 4, 2017, in the Korean Intellectual Property Office, the disclosure of which is incorporated by reference herein in its entirety.

BACKGROUND

1. Field

The present disclosure relates to a wireless communication system, and more particularly, to a phase tracking reference signal (PTRS) operation and indication for a phase noise compensation in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, the demand for wireless data traffic, which is still increasing after the commercialization of the 4G communication system, meets a limitation in being satisfied only by a frequency band used in the 4G system. Therefore, in order to overcome such limitations of frequency resources, the 5G communication system is considering implementation in a high frequency band. However, in this high frequency band, considerable signal attenuation occurs due to the influence of a phase noise. Normally, the phase noise is an effect caused by the incompleteness of an oscillator. In a communication environment using a high-order modulation scheme (e.g., 16QAM, 64QAM, 256QAM), the signal restoration capability is lowered rapidly due to the signal attenuation caused by inter cell interference (ICI) and the common phase error (CPE) caused by phase noise. Therefore, to compensate for the effect of phase noise, a new reference signal for estimating the phase noise is desired. This is called a phase tracking reference signal (PTRS).

Typically, even though a technique of indicating the presence or absence of PTRS has been studied, this technique is merely a method of simply indicating the use or not of PTRS according to a frequency band, and studies on the PTRS configuration and related indication is not sufficient yet. That is, an operation and indication method is not defined yet regarding a time/frequency density of PTRS transmitted by a base station in an environment where various services available for the 5G communication system coexist. Thus, there is a need for such definition.

SUMMARY

Accordingly, it is an object of the present disclosure to provide a method for operating and indicating a PTRS which is one of features of a 5G communication system.

Also, it is another object of the present disclosure to provide a method for configuring and indicating a suitable PTRS for a signal transmission environment through information exchange between a base station and a terminal having different oscillator characteristics.

In accordance with an aspect of the present disclosure, a method for receiving a phase tracking reference signal (PTRS) is provided. The method includes receiving, from a base station on higher layer signaling, information about the PTRS, receiving, from the base station on a physical downlink control channel (PDCCH), information that indicates information used for receiving the PTRS from among the information about the PTRS and receiving, from the base station, the PTRS based on the information used for receiving the PTRS.

The information about the PTRS includes information on a time density of the PTRS and information on a frequency density of the PTRS.

The method may further include transmitting, to the base station, information about a number of PTRS antenna ports.

The information on the number of PTRS antenna ports is determined based on a number of oscillators in the terminal.

In accordance with an aspect of the present disclosure, a method for transmitting a phase tracking reference signal (PTRS) is provided. The method includes transmitting, to a terminal on higher layer signaling, information about the PTRS, transmitting, to the terminal on a physical downlink control channel (PDCCH), information that indicates information used for transmitting the PTRS from among the information about the PTRS and transmitting, to the terminal, the PTRS based on the information used for transmitting the PTRS.

The information about the PTRS includes information on a time density of the PTRS and information on a frequency density of the PTRS.

The method may further include receiving, from the terminal, information about a number of PTRS antenna ports.

The information on the number of PTRS antenna ports is determined based on a number of oscillators in the terminal.

In accordance with an aspect of the present disclosure, a terminal for receiving a phase tracking reference signal (PTRS) is provided. The terminal includes a transceiver and a controller configured to control the transceiver to receive, from a base station on higher layer signaling, information about the PTRS, control the transceiver to receive, from the base station on a physical downlink control channel (PDCCH), information that indicates information used for receiving the PTRS from among the information about the PTRS, and control the transceiver to receive, from the base station, the PTRS based on the information used for receiving the PTRS.

The information about the PTRS includes information on a time density of the PTRS and information on a frequency density of the PTRS.

The controller may be configured to control the transceiver to transmit, to the base station, information about a number of PTRS antenna ports.

The information on the number of PTRS antenna ports is determined based on a number of oscillators in the terminal.

In accordance with an aspect of the present disclosure, a base station for transmitting a phase tracking reference signal (PTRS) is provided. The base station includes a transceiver and a controller configured to control the transceiver to transmit, to a terminal on higher layer signaling, information about the PTRS, control the transceiver to transmit, to the terminal on a physical downlink control channel (PDCCH), information that indicates information used for transmitting the PTRS from among the information about the PTRS and control the transceiver to transmit, to the terminal, the PTRS based on the information used for transmitting the PTRS.

The information about the PTRS includes information on a time density of the PTRS and information on a frequency density of the PTRS.

The controller may be configured to control the transceiver to receive, from the terminal, information about a number of PTRS antenna ports.

According to embodiments of this disclosure, it is possible to efficiently configure a PTRS in a scenario where a base station and a terminal having different PTRS requirements coexist depending on system environments. Further, the terminal can transmit/receive uplink/downlink signals through a PTRS operation suitable for services thereof.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a diagram illustrating examples of a PTRS pattern in cases of localized mapping and distributed mapping.

FIG. 7 is a diagram illustrating an example of PTRS configurations according to cell-specific information and UE capability information.

DETAILED DESCRIPTION

Figure 1:
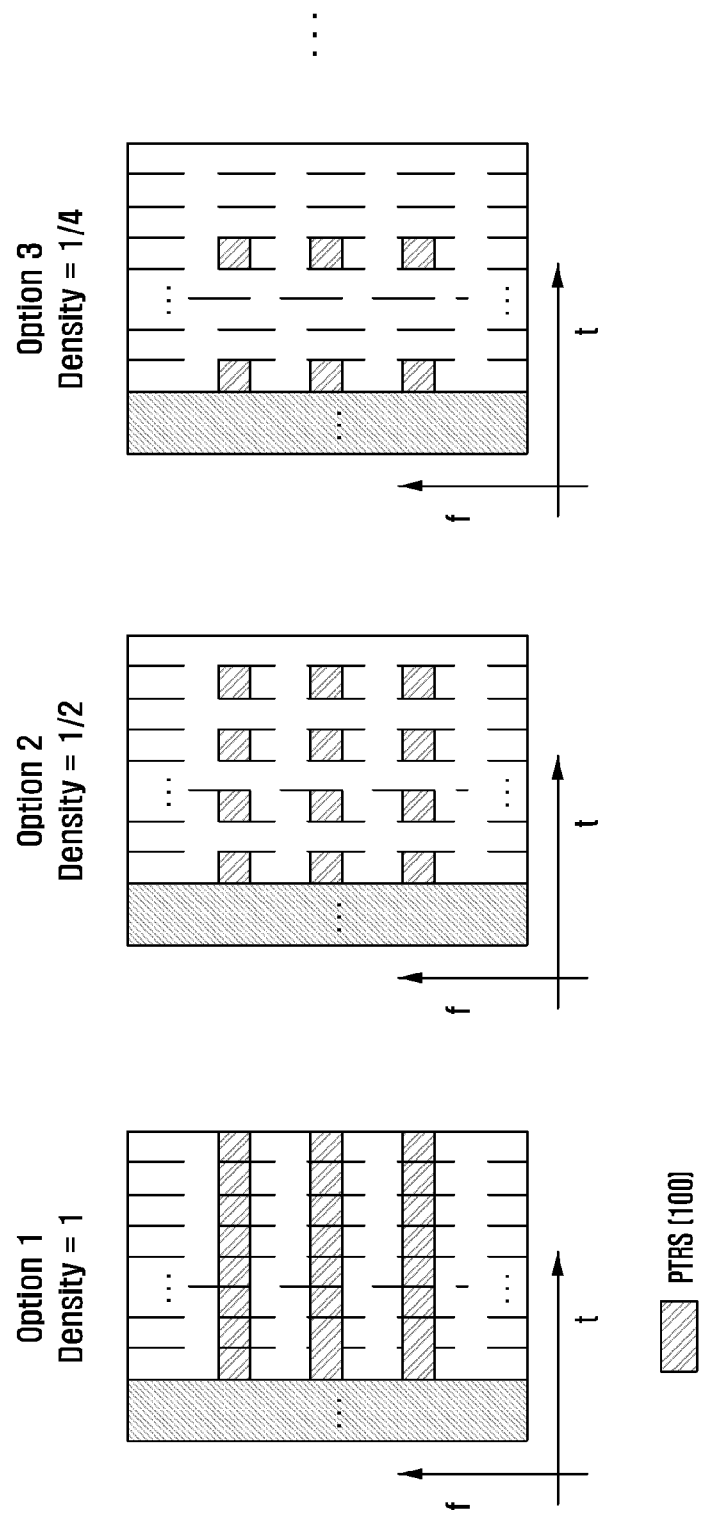
FIG. 1 is a diagram illustrating various examples of a time/frequency density of PTRS.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described with reference to the accompanying drawings.

In the following description of embodiments, descriptions of techniques that are well known in the art and not directly related to the present disclosure are omitted. This is to clearly convey the subject matter of the present disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present disclosure and the manner of achieving them will become apparent with reference to embodiments described in detail below with reference to the accompanying drawings. The present disclosure may, however, be embodied in many different forms and should not be construed as limited to embodiments set forth herein. Rather, these embodiments are provided so that this disclosure will be thorough and complete, and will fully convey the scope of the disclosure to those skilled in the art. To fully disclose the scope of the disclosure to those skilled in the art, and the disclosure is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

The configuration of a PTRS to compensate for the effects of a phase noise may be defined by various system factors. For example, the effects of a phase noise varies depending on various factors such as sub-carrier spacing, scheduled resource block (RB), modulation and coding scheme (MCS) level, signal-to-interference noise ratio (SINR), channel, Doppler, and carrier frequency offset (CFO). This means that the configuration of a PTRS used to compensate for a phase noise may vary depending on situations. FIG. 1 shows various configurations of PTRS 100 according to a PTRS time/frequency density based on the above-described factors. Specifically, there may be various densities on the time axis, such as every symbol (density-1), every other symbol (density-½), and every 4-th symbol (density-¼), and also the PTRS 100 may be allocated at various sub-carrier intervals on the frequency axis.

In view of the accuracy of common phase error (CPE) estimation for compensating for a phase noise, it may be better to use a large number of PTRSs. However, the use of too much PTRSs may increase an RS overhead and also increase an effective code rate.

Figure 2A:
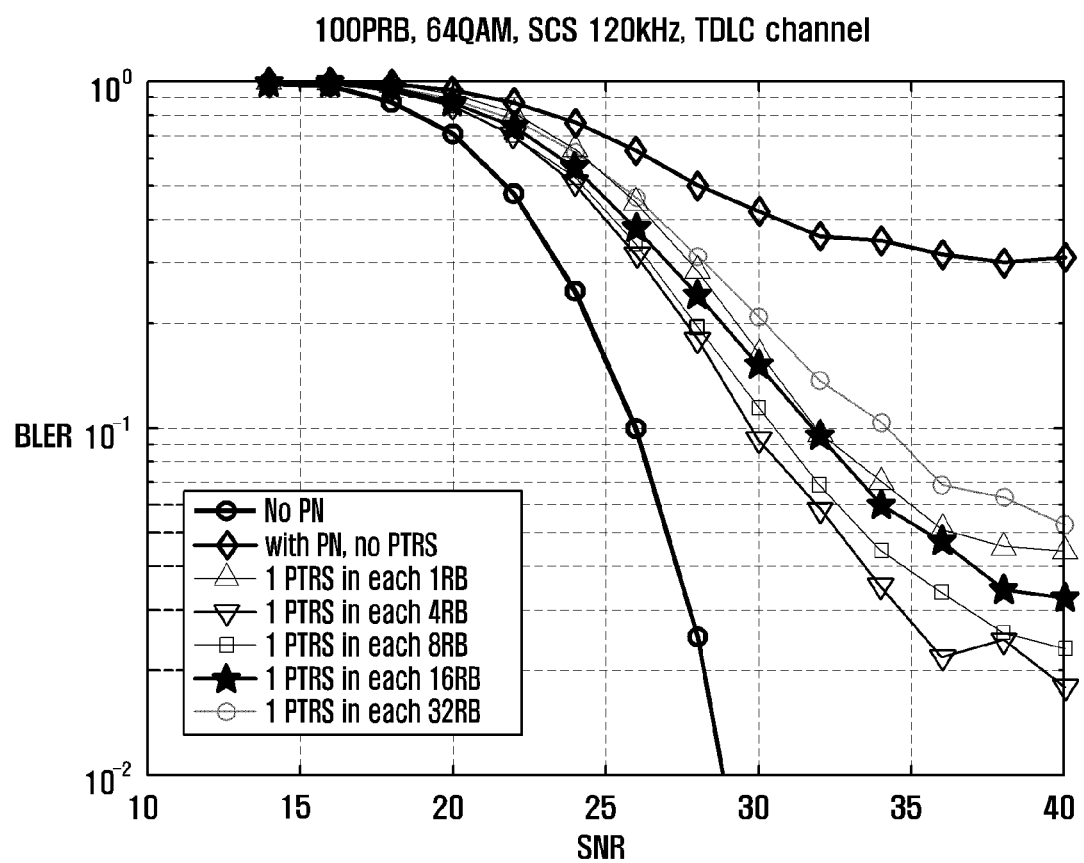
FIGS. 2A and 2B are diagrams illustrating BLER performance according to various PTRS configurations.
Figure 2B:
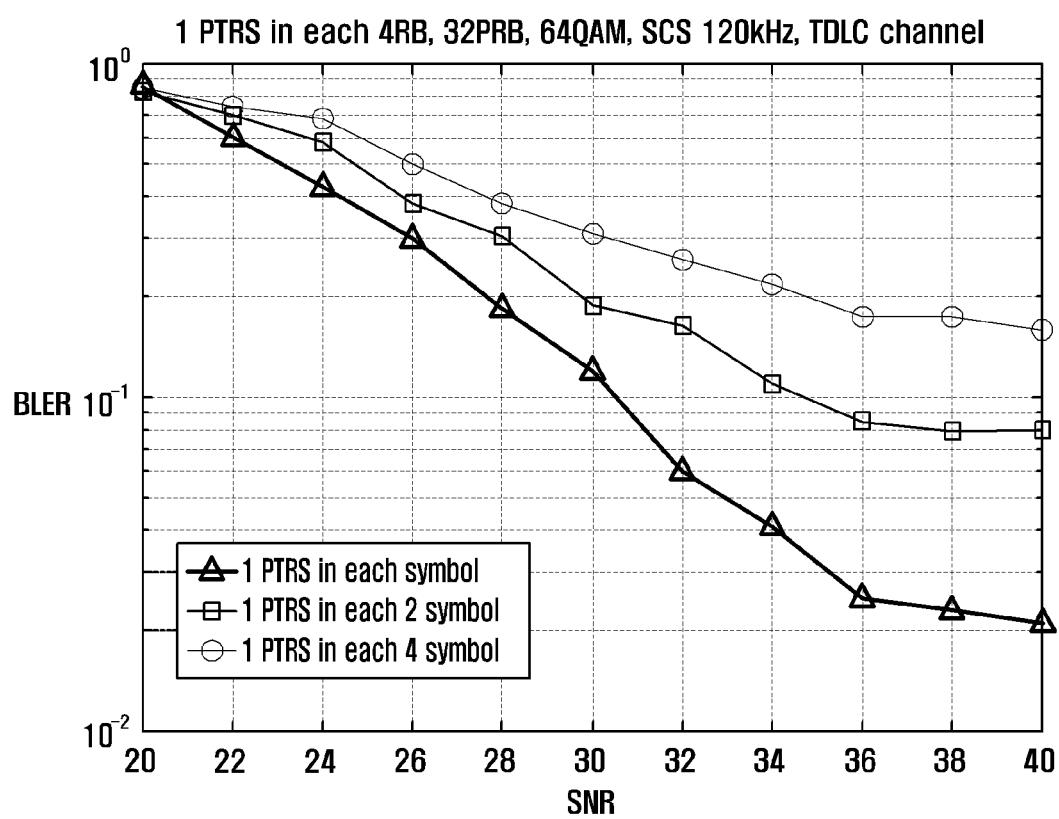

FIGS. 2A and 2B show graphs of BLER performance according to changes in time/frequency PTRS density in various scheduled RB environments. The graph shown in FIG. 2A indicates the performance of a block error rate (BLER) in an environment of 100 PRB, 64QAM, and 15 kHz sub-carrier spacing. On the time axis, there is the PTRS at every OFDM symbol. It can be seen that the best BLER performance is obtained when the PTRS is allocated in every 4 RBs on the frequency axis. That is, as mentioned above, allocating the PTRS in every 1 RB results in a relatively great loss of an effective code rate even though allowing CPE estimation and compensation to be more accurate. This may cause the degradation of the BLER performance. In addition, as seen from a graph shown in FIG. 2B where the PTRS is allocated in every symbol, every other symbol, or every 4-th symbol on the time axis, the optimum PTRS configuration in view of BLER performance may be determined according to the above-mentioned various factors (e.g., scheduled RB, sub-carrier spacing, MCS level, and the like).

Configuring the PTRS is determined according to a mapping method as well as the above-described time/frequency PTRS density.

FIG. 3 is a diagram illustrating examples of a PTRS pattern in cases of localized mapping and distributed mapping. The localized mapping and the distributed mapping method have advantages and disadvantages, respectively, in view of PTRS port multiplexing, for example. Because each terminal should consider independent phase noises resulting from different oscillators, a plurality of PTRS ports (or PTRS antenna ports) are needed. Also, in a multi-layer transmission environment, only one PTRS port may be sufficient or many PTRS ports may be required, depending on case where respective layers use the same oscillator or different oscillators. Thus, in a multi-user or multi-layer transmission environments, PTRS port multiplexing should be considered.

In an embodiment, resources to which a demodulation reference signal (DMRS) 310 and a PTRS 320 are mapped according to the localized mapping method or the distributed mapping method may be as shown in FIG. 3.

Figure 4:
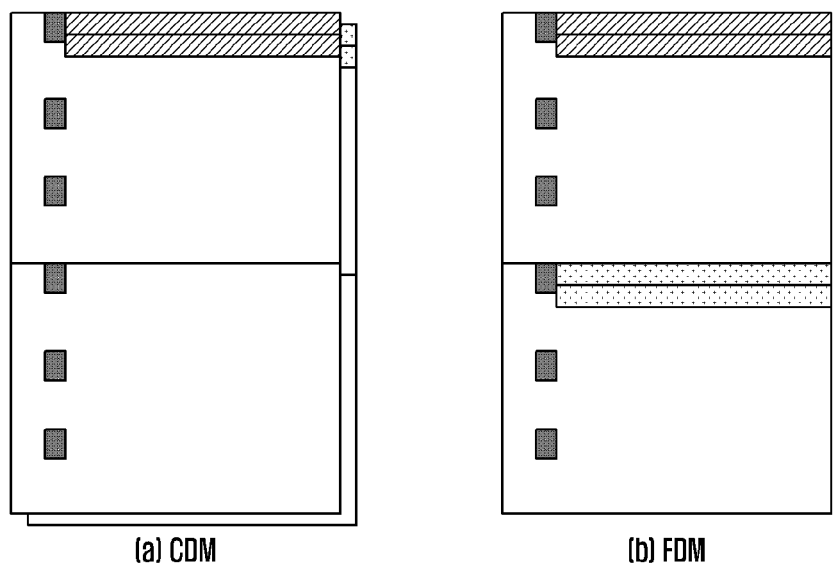
FIG. 4 is a diagram illustrating examples of PTRS port multiplexing in cases of CDM and FDM.

FIG. 4 is a diagram illustrating examples of a code division multiplexing (CDM) scheme based on localized mapping and a frequency division multiplexing (FDM) scheme based on distributed mapping, as PTRS port multiplexing schemes. The distributed mapping method has advantages of improving channel estimation and tracking performance because of allocating PTRSs 420 and 430 at a certain interval on the frequency axis. However, in view of PTRS port multiplexing, the distributed mapping method does not use the CDM scheme and instead uses the FDM scheme to obtain orthogonality. This causes a problem of increasing PTRS overhead. Meanwhile, the localized mapping method can obtain orthogonality by using the CDM scheme without using additional resource elements even though there is a limitation in improvement of channel estimation and tracking performance, which is an advantage of the distributed mapping method. That is, in the FDM scheme, additional resources are used to map resources for PTRS port #2 430 while obtaining orthogonality in a state where resources for PTRS port #1 420 are mapped. However, in the CDM scheme, it is possible, without using additional resources, to map resources for PTRS port #2 430 while obtaining orthogonality in a state where resources for PTRS port #1 420 are mapped. Resources to which a DMRS 410 is mapped in the FDM scheme and the CDM scheme may be as shown in FIG. 4. Thus, signaling should inform a PTRS pattern according to a transmission environment. As an example of operating the PTRS pattern, a method may be performed in which the distributed mapping is set as an initial default and then, if necessary (e.g., multi-user transmission, multi-layer transmission), is changed to the localized mapping through an indication using RRC, MAC CE, or DCI.

In addition to the PTRS pattern operation method described above, suitable signaling should be performed regarding PTRS presence and configuration. As such a signaling method, both explicit and implicit indications may be considered.

Figure 5:
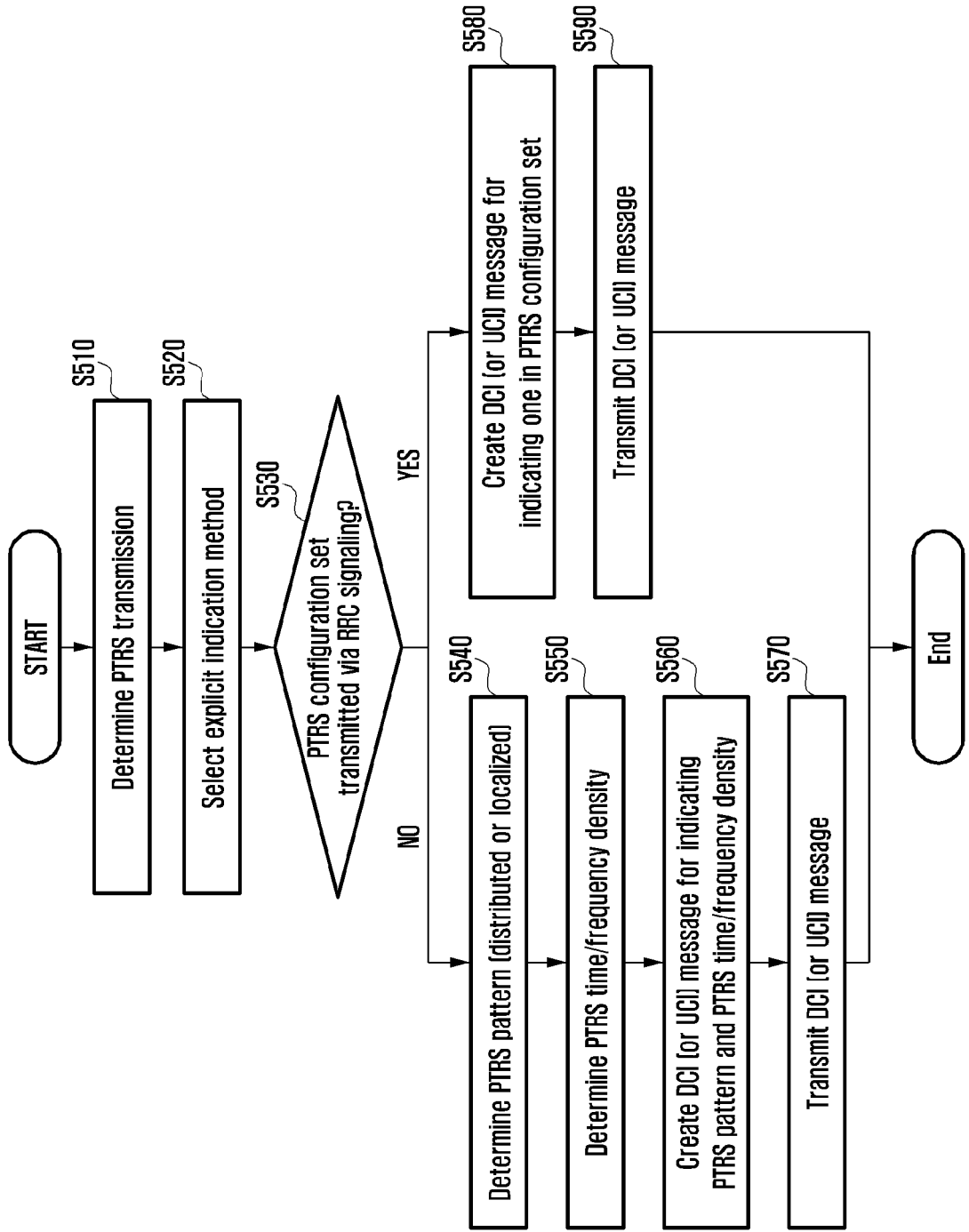
FIG. 5 is a flow diagram illustrating a method for explicitly indicating PTRS presence and configuration information.

FIG. 5 is a flow diagram illustrating an example of indicating PTRS presence and configuration information by an explicit indication method. If it is determined at step S510 to transmit the PTRS, the explicit indication method may be varied at step S520 depending on whether the PTRS configuration is predefined through RRC information. If it is determined at step S530 that a set of PTRS configurations is predefined through the RRC information, downlink control information (DCI) for indicating one in the predefined PTRS configuration set is created at step S580. Then, information to be delivered through the DCI at step S590 may indicate a corresponding one in the set. Therefore, although the overhead of the RRC increases, an increase of the DCI overhead may be controlled to be relatively small. However, if the PTRS configuration is not predefined through the RRC information, a base station may determine at step S540 whether a PTRS pattern is a distributed pattern or a localized pattern, and also determine at step S550 a PTRS time/frequency density. Thereafter, the base station may create a DCI for indicating the determined PTRS pattern and the determined PTRS time/frequency density at step S560 and then transmit the DCI to a terminal at step S570. That is, in this case, information about both the PTRS pattern and density should be transmitted through the DCI. Therefore, the overhead of the DCI may be increased greatly.

Figure 6:
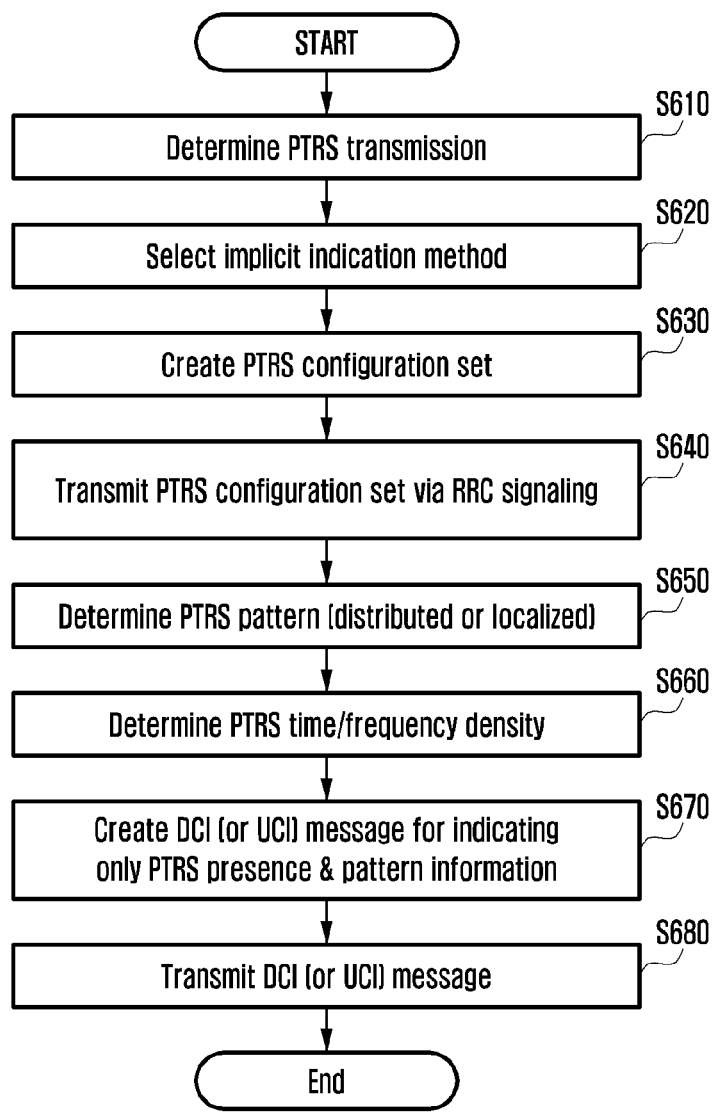
FIG. 6 is a flow diagram illustrating a method for implicitly indicating PTRS presence and configuration information.

FIGS. 6 and 7 are diagrams illustrating a process of indicating PTRS presence and configuration information by an implicit indication method and an example of a PTRS configuration transmitted through RRC signaling (i.e., higher layer signaling). The base station determines at step S610 the transmission of the PTRS and selects at step S620 the implicit indication method to indicate the PTRS presence and configuration information. Then, at step S630, the base station creates a PTRS configuration set. As shown in FIG. 7, the PTRS configuration set defines PTRS configurations according to the values of SCS, MCS level, and scheduled RB that affect the PTRS configuration as described above. At step S640, the base station transmits the PTRS configuration set to the terminal through the RRC signaling. Then, the base station may determine at step S650 whether a PTRS pattern is a distributed pattern or a localized pattern, and also determine at step S660 a PTRS time/frequency density. Thereafter, the base station creates a DCI for indicating information about the PTRS presence and pattern (distributed mapping or localized mapping) at step S670 and transmits the DCI to the terminal at step S680, for example using a physical downlink control channel (PDCCH). Then, the terminal may determine the PTRS configuration by using information, previously transmitted through the DCI, about sub-carrier spacing, MCS level, and scheduled RB. Although the above discussion regarding FIGS. 5, 6, and 7 is made in view of downlink, this may be equally applied to an uplink environment. That is, information transmitted through the DCI may be similarly transmitted through UCI.

As described so far, a method and apparatus for signaling and operating on the presence/indication of the PTRS should be considered at least in a transmitting end. However, actually, the phase noise appears by both the effect of a transmitter's oscillator and the effect of a receiver's oscillator. Also, in the 5G communication, the base station and the terminal may be different from each other in the number of oscillators and the characteristics such as precision. This means that the base station or terminal cannot independently perform the configuration of the PTRS used to compensate for the phase noise. Therefore, the terminal should properly transmit information about the PTRS configuration to the base station.

Specifically, like the base station, the terminal has oscillators of different performance causing different phase noise characteristics. Because the base station cannot know such oscillator characteristics of the terminal, the terminal should inform the base station about the oscillator characteristics. In addition, the terminal should deliver information about the number of oscillators (e.g., multi-panel with multi-OSC) to the base station. The terminal should transmit at least the above-mentioned information about the oscillator to the base station, and the base station should perform the proper PTRS configuration, based on the above information.

Figure 8:
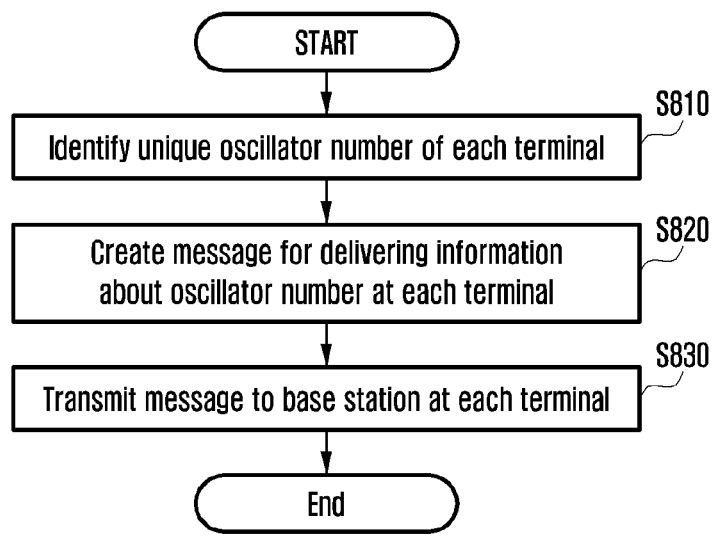
FIG. 8 is a flow diagram illustrating a message reporting method for PTRS configuration of a terminal.

FIG. 8 is a flow diagram illustrating a message reporting method for PTRS configuration of a terminal. Each of terminals for data transmission within a cell identifies the number of its own oscillators at step S810 and, based on this, creates a message for informing phase noise information at step S820. The number of oscillators corresponds to the number of PTRS ports of each terminal. Each terminal reports the created message to the base station at step S830. This reporting message may be transmitted via a signal such as RACH msg1 or UE capability information. The base station receives, from each terminal, such a reporting message related to the number of oscillators of each terminal.

Figure 9:
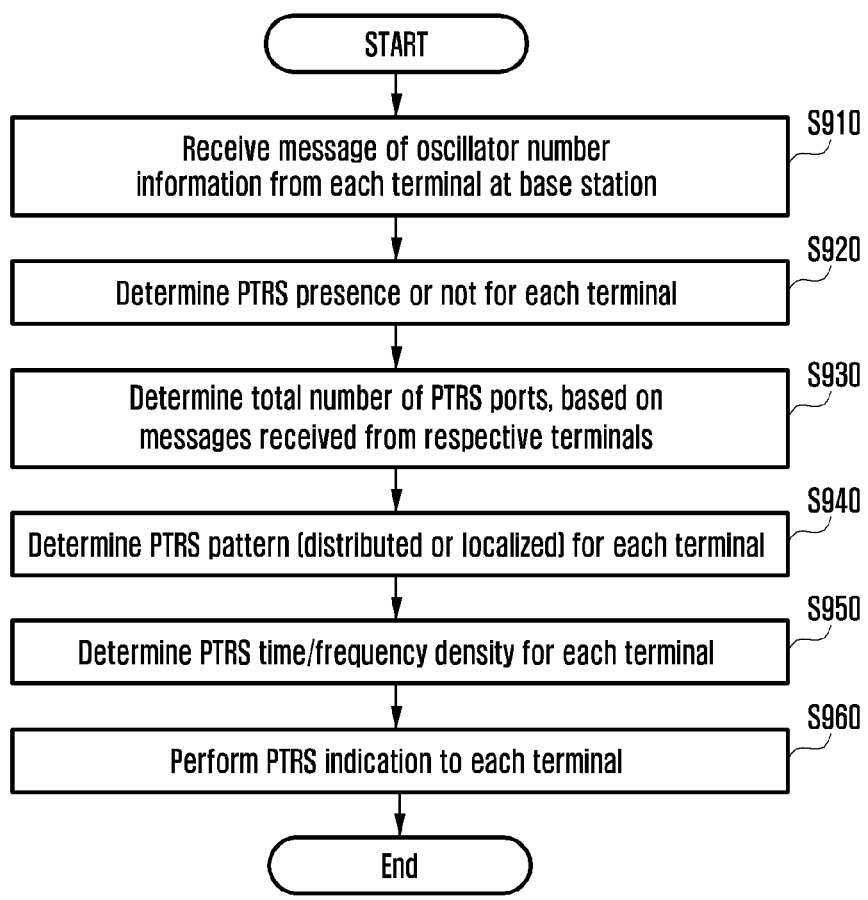
FIG. 9 is a flow diagram illustrating a PTRS configuration and indication method of a base station based on reporting information of a terminal.

FIG. 9 is a flow diagram illustrating a PTRS configuration and indication method of a base station, based on reporting information of a terminal as described above in FIG. 8. The base station performs PTRS configuration, based on a reporting message received from each terminal at step S910. Specifically, the base station determines a PTRS presence or not for each terminal through scheduling at step S920. That is, based on the MCS level, the number of scheduled RBs, the sub-carrier spacing, the channel environment, etc., the base station determines whether to compensate for the phase noise through the PTRS. Then, at step S930, the base station determines the total number of PTRS ports by summing up the reporting messages of the respective terminals. Because the terminals may have different numbers of oscillators, the number of PTRS ports required for each terminal may be varied and thus the total number of PTRS ports may be varied. Thereafter, at step S940, the base station individually determines a PTRS pattern for each of the terminals for which it is determined to use the PTRS. A detailed description about a process of determining the PTRS pattern will be given later. After determining the PTRS pattern suitable for each terminal, the base station determines a suitable PTRS time/frequency density for each terminal at step S950. That is, the base station determines the time/frequency density, based on the MCS level, the number of scheduled RBs, and the sub-carrier spacing of each terminal, and then completes the PTRS configuration, based on the determined PTRS port number and the determined PTRS pattern. Thereafter, in order to inform each terminal about the PTRS configuration, the base station performs the above-described PTRS indication process of FIG. 6 at step S960.

Figure 10:
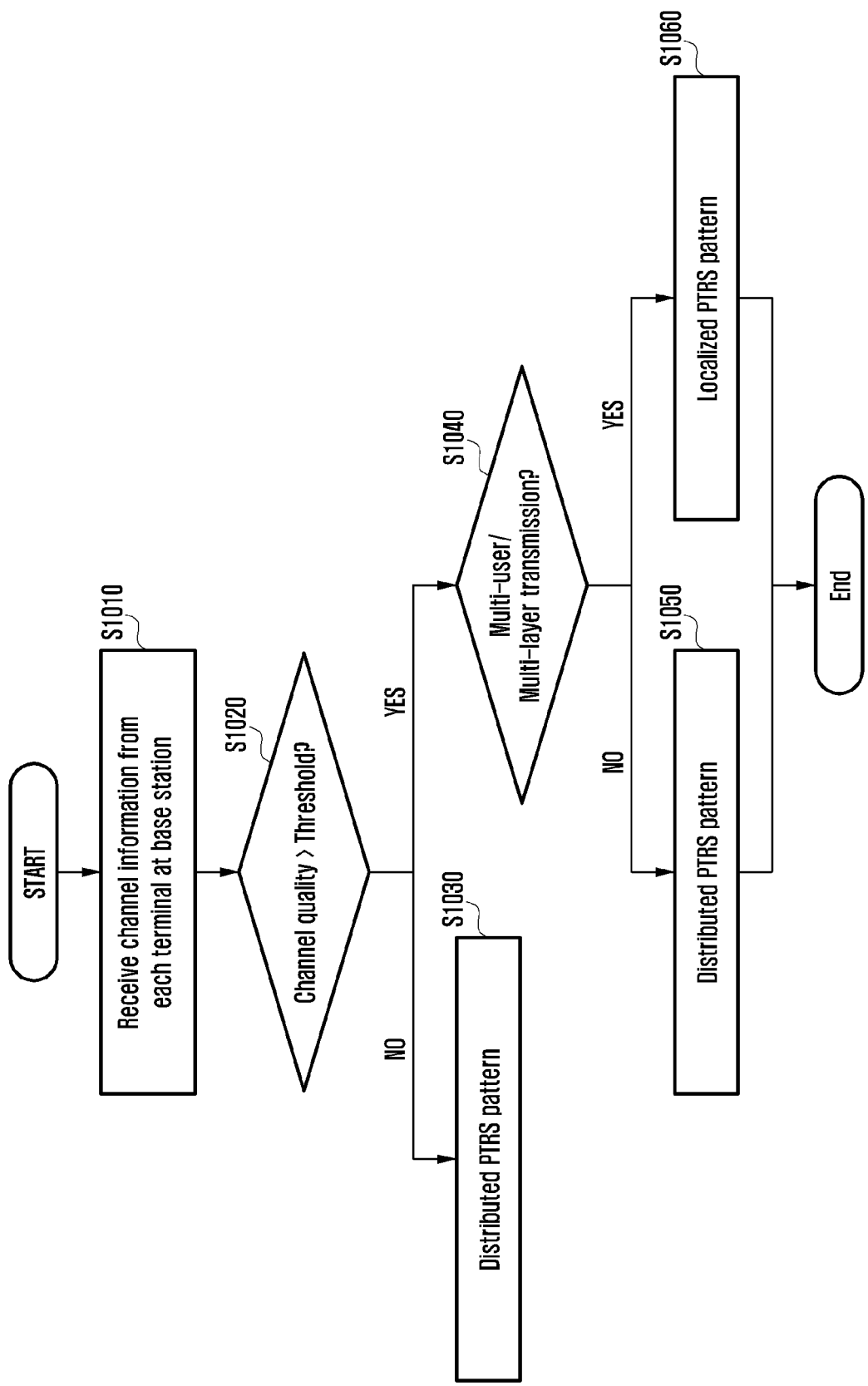
FIG. 10 is a flow diagram illustrating a method for determining a PTRS pattern according to a channel quality and multi-user/multi-layer transmission.

FIG. 10 is a flow diagram illustrating an example of PTRS pattern determination in the above-described FIG. 9 process. As described above, the distributed pattern and the localized pattern each have advantages and disadvantages. Based on such advantages and disadvantages, the PTRS pattern may be determined as shown in FIG. 10. Specifically, the base station receives channel information from each terminal at step S1010. If it is determined at step S1020 that a channel quality of each terminal is smaller than a specific threshold, that is, if a channel state is not good, the base station selects a distributed PTRS pattern at step S1030 in order to improve channel estimation accuracy. Here, the channel quality may be determined on the basis of various parameters such as CSI information, Doppler effects, and delay spread. If the channel quality is good enough to exceed the threshold, the base station checks at step S1040 whether a transmission mode is multi-user or multi-layer transmission or not. In this case, an environment is assumed that the multi-layer transmission uses two or more oscillators. If the transmission mode is the multi-user transmission or the multi-layer transmission, the base station selects a localized PTRS pattern at step S1060 in order to perform port multiplexing. Otherwise, the base station selects the distributed PTRS pattern at step S1050.

Figure 11:
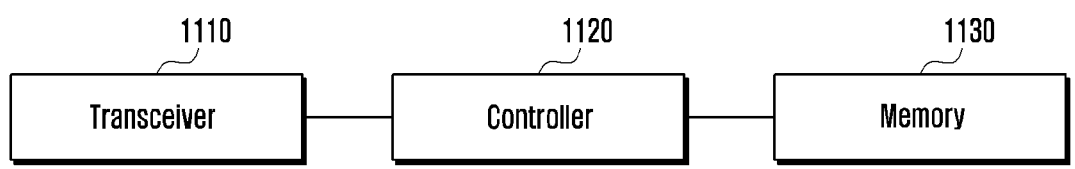
FIG. 11 is a block diagram illustrating a structure of a terminal according to an embodiment of the present disclosure.

FIG. 11 is a block diagram illustrating a structure of a terminal according to an embodiment of the present disclosure.

As shown in FIG. 11, the terminal may include a transceiver 1110, a controller 1120, and a storage 1130. In this disclosure, the controller 1120 may be defined as a circuit, an application-specific integrated circuit, or at least one processor.

The transceiver 1110 may transmit or receive a signal to or from any other network entity. For example, the transceiver 1110 may receive, from a base station, system information, a synchronization signal, or a reference signal.

The controller 1120 may control the overall operation of the terminal according to embodiments of the present disclosure. For example, the controller 1120 may control a signal flow between respective blocks to perform the above-described operations of the flow diagrams. Specifically, in the message reporting for the PTRS configuration according to embodiments of the present disclosure, the controller 1120 may control the above-described operations to identify the number of oscillators and thereby create a message for informing phase noise information.

The storage 1130 may store at least one of information transmitted/received through the transceiver 1110 and information created through the controller 1120. For example, the storage 1130 may store the number of oscillators of the terminal, the created message, and the like.

Figure 12:
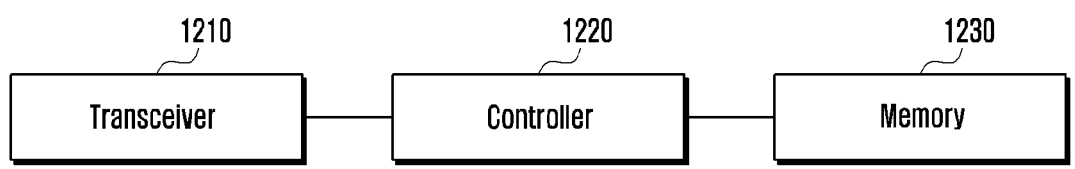
FIG. 12 is a block diagram illustrating a structure of a base station according to an embodiment of the present disclosure.

FIG. 12 is a block diagram illustrating a structure of a base station according to an embodiment of the present disclosure.

As shown in FIG. 12, the base station may include a transceiver 1210, a controller 1220, and a storage 1230. In this disclosure, the controller 1220 may be defined as a circuit, an application-specific integrated circuit, or at least one processor.

The transceiver 1210 may transmit or receive a signal to or from any other network entity. For example, the transceiver 1210 may transmit, to a terminal, system information, a synchronization signal, or a reference signal.

The controller 1220 may control the overall operation of the base station according to embodiments of the present disclosure. For example, the controller 1220 may control a signal flow between respective blocks to perform the above-described operations of the flow diagrams. Specifically, the controller 1220 may control the above-described operations in order to perform the PTRS configuration according to embodiments of the present disclosure.

The storage 1230 may store at least one of information transmitted/received through the transceiver 1210 and information created through the controller 1220. For example, the storage 1230 may store a reporting message received from the terminal, and the like.

The above description may be utilized not only for downlink but also for uplink. In case of uplink, the terminal may perform a suitable PTRS configuration, based on information about phase noise, such as an oscillator number of a base station, delivered through cell-specific information. Alternatively, the base station may perform the PTRS configuration and then deliver it to the terminal.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for transmitting a phase tracking reference signal (PTRS) by a base station, the method comprising:
   receiving, from a user equipment (UE), UE capability information associated with indicating a number of PTRS antenna ports associated with the UE;
   transmitting, to the UE on higher layer signaling, PTRS configuration information including two or more PTRS patterns;
   transmitting, to the UE on a physical downlink control channel (PDCCH), downlink control information (DCI) that includes a modulation and coding scheme (MCS) level and a scheduled resource block (RB), wherein the MCS level and the scheduled RB are associated with one of the two or more PTRS patterns;
   receiving, from the UE, channel quality information;
   identifying whether the channel quality information received from the UE is smaller than a threshold;
   selecting a distributed PTRS pattern to transmit to the UE based on whether the received channel quality information is smaller than the threshold; and
   transmitting, to the UE, the selected distributed PTRS pattern.

2. The method of claim 1, wherein each of the two or more PTRS patterns includes information on a time density of the PTRS and information on a frequency density of the PTRS.

3. The method of claim 1, further comprising:
   receiving, from the UE, an uplink PTRS based on the number of PTRS antenna ports.

4. The method of claim 1, wherein the number of PTRS antenna ports is determined based on a number of oscillators in the UE.

5. The method of claim 1, wherein the PTRS configuration information further includes information about whether a mapping of the PTRS is distributed or localized.

6. A base station for transmitting a phase tracking reference signal (PTRS), the base station comprising:
   a transceiver; and
   a controller configured to:
      control the transceiver to receive, from a user equipment (UE), UE capability information associated with indicating a number of PTRS antenna ports associated with the UE,
      control the transceiver to transmit, to the UE on higher layer signaling, PTRS configuration information including two or more PTRS patterns,
      control the transceiver to transmit, to the UE on a physical downlink control channel (PDCCH), downlink control information (DCI) that includes a modulation and coding scheme (MCS) level and a scheduled resource block (RB), wherein the MCS level and the scheduled RB are associated with one of the two or more PTRS patterns,
      control the transceiver to receive, from the UE, channel quality information,
      identify whether the channel quality information received from the UE is smaller than a threshold,
      select a distributed PTRS pattern to transmit to the UE based on whether the received channel quality information is smaller than the threshold, and
      control the transceiver to transmit, to the UE, the selected distributed PTRS pattern.

7. The base station of claim 6, wherein each of the two or more PTRS patterns includes information on a time density of the PTRS and information on a frequency density of the PTRS.

8. The base station of claim 6, wherein the controller is further configured to control the transceiver to receive, from the UE, an uplink PTRS based on the number of PTRS antenna ports.

9. The base station of claim 6, wherein the number of PTRS antenna ports is determined based on a number of oscillators in the UE.

10. The base station of claim 6, wherein the information about the PTRS includes information about whether a mapping of the PTRS is distributed or localized.

* * * * *